United States Patent [19]

Satoh et al.

[11] Patent Number: 5,126,420
[45] Date of Patent: Jun. 30, 1992

[54] RTV ORGANOPOLYSILOXANE COMPOSITIONS

[75] Inventors: Shinichi Satoh; Toshio Takago; Hitoshi Kinami, all of Annaka, Japan

[73] Assignee: Shin-Etsu Chemical Co., Ltd., Tokyo, Japan

[21] Appl. No.: 562,318

[22] Filed: Aug. 3, 1990

[30] Foreign Application Priority Data

Aug. 3, 1989 [JP] Japan .................................. 1-202116

[51] Int. Cl.$^5$ .............................................. C08G 77/20
[52] U.S. Cl. .......................................... 528/32; 528/41; 528/42; 528/33; 528/34; 528/901
[58] Field of Search .................. 528/41, 42, 33, 34, 528/32, 901

[56] References Cited

U.S. PATENT DOCUMENTS 4,734,479  3/1988  Inoue et al. .................. 528/34

Primary Examiner—Melvyn I. Marquis
Attorney, Agent, or Firm—Birch, Stewart, Kolasch & Birch

[57] ABSTRACT

A mixture of (A) a diorganopolysiloxane end-blocked with a hydroxyl group, (B) an $\alpha,\beta$-substituted vinyloxysilane, or a hydrolyzate thereof, and (C) a perfluorocarboxylic acid derivative provides an RTV organopolysiloxane composition which is stable and non-corrosive to metal.

2 Claims, No Drawings

RTV ORGANOPOLYSILOXANE COMPOSITIONS

This invention relates to room temperature vulcanizable (RTV) organopolysiloxane compositions which readily cure in the presence of humidity, and more particularly, to RTV organopolysiloxane compositions which are shelf stable and when applied to corrodible metals, do not corrode the metals.

BACKGROUND OF THE INVENTION

Organopolysiloxane compositions which remain stable and free flowing during shelf storage in a sealed condition, but when exposed to the ambient air, cure into rubbery elastomers at room temperature under the action of humidity are known in the art as RTV organopolysiloxane compositions. They have been widely used as sealants, coatings, and adhesives in building, machinery, electrical and other industrial fields.

RTV organopolysiloxane compositions are generally classified into acetate type, oxime type, alcohol type, hydroxyamine type, and amine type depending on the type of compound to be eliminated. The compositions of acetate, oxime, hydroxyamine, and amine types are undesirably corrosive to the surrounding metal while the compositions of alcohol type become unlikely to cure after long-term storage.

To overcome these drawbacks, Japanese Patent Application Kokai No. 11953/1979 proposes an RTV organopolysiloxane composition which is shelf stable and does not corrode the surrounding metal. This composition, however, tends to yellow under the influence of ultraviolet rays and heat and does not cure under acidic conditions since the curing catalyst is a guanidine compound.

An object of the present invention is to eliminate the above-mentioned drawbacks of the prior art RTV organopolysiloxane compositions and to provide a novel and improved RTV organopolysiloxane composition which is non-corrosive to metals, shelf stable, discoloration resistant, and curable under acidic conditions.

SUMMARY OF THE INVENTION

The inventors have found that by blending the following components:
(A) a diorganopolysiloxane blocked with a hydroxyl group at each end of its molecular chain,
(B) an $\alpha,\beta$-substituted vinyloxysilane of general formula (I) or (II):

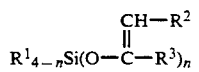

(I)

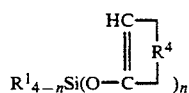

(II)

wherein
R$^1$ is a substituted or unsubstituted monovalent hydrocarbon group,
R$^2$ and R$^3$ are independently selected from the class consisting of a hydrogen atom and a substituted or unsubstituted monovalent hydrocarbon group,
R$^4$ is a substituted or unsubstituted divalent hydrocarbon group, and letter n is equal to 3 or 4, or a hydrolyzate thereof, and
(C) a perfluorocarboxylic acid derivative of the general formula (III):

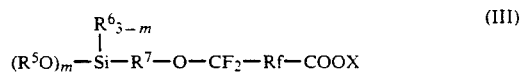

wherein
R$^5$ and R$^6$ are independently selected from substituted or unsubstituted monovalent hydrocarbon groups,
R$^7$ is a substituted or unsubstituted divalent hydrocarbon group,
Rf is a divalent perfluoroalkyl or perfluoroalkylether group,
X is a hydrogen atom or triorganosilyl group, and
letter m is equal to 2 or 3, there is obtained a room temperature vulcanizable organopolysiloxane composition which is shelf stable and improved in curing properties, that is, well curable at room temperature even under acidic conditions into cured products which are resistant against thermal degradation and discoloration.

The present invention provides an RTV organopolysiloxane composition comprising components (A), (B), and (C) as defined above.

DETAILED DESCRIPTION OF THE INVENTION

Component (A) is a diorganopolysiloxane blocked with a hydroxyl group at each end of its molecular chain, which may be of the following general formula.

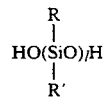

In the formula, R and R', which may be the same or different, are independently selected from substituted or unsubstituted monovalent hydrocarbon groups, preferably having 1 to 8 carbon atoms, for example, alkyl groups such as methyl, ethyl, and propyl; cycloalkyl groups such as cyclopentyl and cyclohexyl; alkenyl groups such as vinyl and allyl; aryl groups such as phenyl and tolyl; alkenyloxy groups such as isopropenoxy and isobutenoxy; and substituted ones of these group in which some hydrogen atoms are replaced by halogen atoms or the like, such as 3,3,3-trifluoropropyl, chloromethyl and 3-chloropropyl. Letter l is an integer of at least 10. The diorganopolysiloxane preferably has a viscosity of 25 to 500,000 centistokes, more preferably 1,000 to 100,000 centistokes at 25° C.

Component (B) is a crosslinking agent in the form of an $\alpha,\beta$-substituted vinyloxysilane of the following general formula (I) or (II) or a hydrolyzate thereof.

(I)

-continued

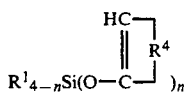 (II)

In formulae (I) and (II), $R^1$ is a substituted or unsubstituted monovalent hydrocarbon group, preferably having 1 to 8 carbon atoms, $R^2$ and $R^3$, which may be the same or different, are independently selected from the class consisting of a hydrogen atom and a substituted or unsubstituted monovalent hydrocarbon group, preferably having 1 to 6 carbon atoms, $R^4$ is a substituted or unsubstituted divalent hydrocarbon group, preferably having 1 to 6 carbon atoms, and letter n is equal to 3 or 4.

Examples of the monovalent hydrocarbon group represented by $R^1$, $R^2$, and $R^3$ include the same alkyl, cycloalkyl, alkenyl, aryl and substituted groups having some hydrogen atoms replaced by halogen as illustrated for R and R'. The divalent hydrocarbon groups represented by $R^4$ include alkylene groups such as methylene and ethylene.

Several illustrative, non-limiting examples of the vinyloxysilane or hydrolyzate thereof include methyl(isopropenoxy)silane, vinyl(isopropenoxy)silane, phenyltri(isopropenoxy)silane, propyltri(isopropenoxy)silane, tetra(isopropenoxy)silane, 2-cyanoethyltri(isopropenoxy)silane, 3,3,3-trifluoropropyltri(isopropenoxy)silane, 3-chloropropyltri(isopropenoxy)silane, methyltri(1-phenylethynyloxy)silane, methyltri(isobutenyloxy)silane, methyltri(isopentyloxy)silane, vinyltri(cyclopentanoxy)silane, methyltri(cyclohexanoxy)silane and partial hydrolyzates thereof. These vinyloxysilanes may be obtained by dehydrochlorination reaction between ketones and silane halides using as acid acceptors organic amines such as triethylamine and dimethylaniline or metallic sodium, if desired, in the presence of catalysts such as zinc oxide.

Most often, to 100 parts by weight of component (A) is added 1 to 25 parts by weight of component (B). Compositions containing less than 1 part of component (B) per 100 parts by weight of component (A) tend to gel during preparation and subsequent storage or to cure into elastomers having less desirable physical properties. With more than 25 parts of component (B), compositions would cure by a large shrinkage factor into elastomers having less desirable physical properties.

Component (C) is a curing catalyst in the form of a perfluorocarboxylic acid derivative of the following general formula (III).

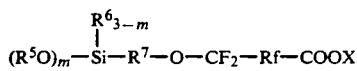 (III)

In the formula, $R^5$ and $R^6$ are independently selected from substituted or unsubstituted monovalent hydrocarbon groups, preferably having 1 to 8 carbon atoms, $R^7$ is a substituted or unsubstituted divalent hydrocarbon group, preferably having 1 to 6 carbon atoms, Rf is a divalent perfluoroalkyl or perfluoroalkylether group, X is a hydrogen atom or a triorganosilyl group, and letter m is equal to 2 or 3.

The divalent hydrocarbon groups represented by $R^7$ are the same as described for $R^4$.

The groups represented by Rf are divalent perfluoroalkyl groups such as difluoromethylene, tetrafluoroethylene, and hexafluoropropylene and divalent perfluoroalkylether groups such as

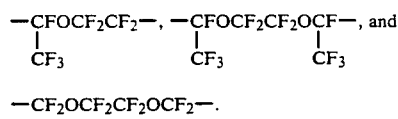

$-CF_2OCF_2CF_2OCF_2-$.

The triorganosilyl groups represented by X include trimethylsilyl, vinyldimethylsilyl, and phenyldimethylsilyl groups.

Among the compounds of formula (III), more preferred are those of the following general formula (III'):

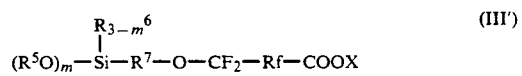 (III')

wherein $R^5$, $R^6$, $R^7$, X and m are as defined above, and Rf is a divalent perfluoroalkyl or perfluoroalkylether group of the following general formula (1):

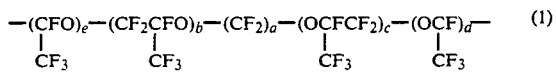 (1)

wherein a is an integer of from 0 to 8, b and c are integers of from 0 to 3, e and d are equal to 0 or 1, with the proviso that e=b=c=d=0 when a=0; b=0 when e=0; and c=0 when d=0.

The perfluorocarboxylic acid derivative of formula (III') may be synthesized by reacting a perfluorocarboxylic acid having an unsaturated group with a triorganochlorosilane to silylate the carboxylic acid moiety and then effecting addition reaction between the unsaturated group and a hydrosilane.

More particularly, a compound of formula (III') wherein $R^7$ is $-(CH_2)_3$ is prepared by reacting (a) a compound terminated with acid fluoride at each end having the general formula:

 (2)

wherein Rf is as defined above, with (b) an alkali fluoride such as cesium fluoride in a polar solvent, and adding dropwise (c) an allyl halide to the reaction mixture. There is obtained a compound of the general formula:

 (3)

In this reaction, the molar ratio (b/a) of alkali fluoride (b) to acid fluoride-terminated compound (a) is preferably 1 or higher, more preferably from 1.2 to 1.7, and the molar ratio (c/a) of allyl fluoride (c) to acid fluoride-terminated compound (a) is preferably 1 or higher, more preferably from 1.5 to 2. The reaction temperature preferably ranges from 50° to 100° C. The allyl halides used herein include allyl chloride, allyl bromide and allyl iodide. The polar solvents used herein include ether solvents such as diglyme (diethylene glycol dimethyl ether) and tetraglyme.

Next, by reacting the compound of formula (3) with a lithium halide, there is produced an acid halide of general formula (4):

$$CH_2=CHCH_2O-CF_2-Rf-\overset{O}{\underset{\|}{C}}-X' \quad (4)$$

wherein Rf is as defined above and X' is a chlorine, bromine or iodine atom. Also, by hydrolyzing the compound of formula (3), there is produced a carboxylic acid of general formula (5):

$$CH_2=CHCH_2O-CF_2-Rf-\overset{O}{\underset{\|}{C}}-OH \quad (5)$$

wherein Rf is as defined above. The carboxylic acid of formula (5) is then reacted with a triorganosilylating agent to form a compound of general formula (6):

$$CH_2=CHCH_2O-CF_2-Rf-\overset{O}{\underset{\|}{C}}-X'' \quad (6)$$

wherein Rf is as defined above and X'' is a triorganosiloxy group.

Finally, by effecting hydrosilylation between the thus obtained compound of formula (7):

$$CH_2=CHCH_2O-CF_2-Rf-\overset{O}{\underset{\|}{C}}-OX \quad (7)$$

wherein Rf and X are as defined above and a hydrosilane of general formula (8):

$$(R^5O)_m-\underset{\underset{R_{3-m}^6}{|}}{Si}-H \quad (8)$$

wherein $R^5$, $R^6$, and m are as defined above in the presence of an organic platinum complex catalyst, there can be synthesized a fluorinated carboxylic acid-containing silane of general formula (III'a):

$$(R^5O)_m-\underset{\underset{R_{3-m}^6}{|}}{Si}-(CH_2)_3-O-CF_2-Rf-\overset{O}{\underset{\|}{C}}-OX \quad (III'a)$$

wherein $R^5$, $R^6$, Rf, X and m are as defined above.

In the hydrosilylation reaction, the molar ratio of hydrosilane of formula (8) to fluorinated carboxylic acid derivative of formula (7) is preferably 1 or higher, more preferably from 1 to 1.5. The organic platinum complex is present in a concentration of $1\times10^{-3}$ to $1\times10^{-6}$%. The reaction may be carried out in a solvent which is usually benzene, toluene, xylene or hexane.

The substituted or unsubstituted monovalent hydrocarbon groups represented by $R^5$ include alkyl groups such as methyl, ethyl, and propyl; alkenyl groups such as vinyl and allyl; cycloalkyl groups such as cyclopentyl and cyclohexyl; aryl groups such as phenyl and tolyl; alkenyloxy groups such as isopropenoxy and isobutenoxy; and haloalkyl groups such as 2,2,2-trifluoroethoxy and 3,3,3-trifluoro-2-trifluoropropoxy.

The substituted or unsubstituted monovalent hydrocarbon groups represented by $R^6$ include alkyl groups such as methyl, ethyl, and propyl; alkenyl groups such as vinyl and allyl; cycloalkyl groups such as cyclopentyl and cyclohexyl; aryl groups such as phenyl and tolyl; and haloalkyl groups such as 3,3,3-trifluoropropyl and 3,3,4,4,5,5,6,6,6-nonafluorohexyl. The triorganosilyl groups represented by X include trimethylsilyl, vinyldimethylsilyl, triethylsilyl, trivinylsilyl, phenyl-dimethylsilyl, 3,3,3-trifluoropropyldimethylsilyl, and 3,3,4,4,5,5,6,6,6-nonafluorohexyldimethylsilyl groups.

Examples of the perfluorocarboxylic acid derivative of formula (III) are given below. In the following structural formulae, Vi is vinyl and Ph is phenyl.

$(CH_3O)_3Si(CH_2)_3OCF_2COOH$ $(CH_3O)_3Si(CH_2)_3O(CF_2)_5COOH$ $(CH_3O)_3Si(CH_2)_3O(CF_2)_5COOSi(CH_3)_3$ $(CF_3CH_2O)_3Si(CH_2)_3O(CF_2)_5COOSi(CH_3)_3$ $(CF_3CH_2O)_3Si(CH_2)_3O(CF_2)_5COOSi(CH_3)_2$
                                                                    |
                                                                    Vi $(CF_3CH_2O)_3Si(CH_2)_3O(CF_2)_5COOSi(CH_3)_2$
                                                                    |
                                                                    Ph $(CF_3CH_2O)_2Si(CH_2)_3O(CF_2)_5COOH$
          |
          $CH_3$ $(CH_2=CO)_2Si(CH_2)_3O(CF_2)_5COOSi(CH_3)_3$
     |         |
     $CH_3$   $CH_3$ $(CF_3CH_2O)_3Si(CH_2)_3OCF_2CFOCF_2CF_2OCFCOOSi(CH_3)_3$
                                    |                    |
                                    $CF_3$              $CF_3$ $(CF_3CH_2O)_2Si(CH_2)_3OCF_2CFOCF_2CF_2OCFCOOSi(CH_3)_3$
          |                         |                    |
          $CH_3$                    $CF_3$              $CF_3$ $(CH_2=CO)_2Si(CH_2)_3OCF_2CFOCF_2CF_2OCFCOOSi(CH_3)_3$
     |         |                    |                    |
     $CH_3$   $CH_3$                $CF_3$              $CF_3$

Most often, to 100 parts by weight of component (A) is added 0.01 to 5 parts by weight of component (C). With less than 0.01 part of component (C), it will take a long time until a coating of the composition becomes tack free upon exposure to air, and internal curing becomes slow. The presence of component (C) in excess of 5 parts by weight is less desirable for workability and appearance because compositions have a very short pot life of several seconds and tend to discolor upon heating. Preferably 0.1 to 1 part by weight of component (C) is used per 100 parts by weight of component (A).

RTV compositions of the one part type are obtained simply by uniformly mixing amounts of components (A), (B) and (C) in a dry atmosphere. Two part compositions are also contemplated. In this case, a first part of components (A) and (B) and a second part of component (C) are contained in separate packs and mixed on use. In either case, when the compositions are exposed to the ambient air, crosslinking reaction takes place under the influence of moisture in the air whereby the compositions cure into rubbery elastomers.

The compositions of the invention may further contain any desired additives in amounts suitable for their purposes. Useful additives include reinforcing fillers such as fumed silica, precipitated silica, carbon powder, titanium dioxide, aluminum oxide, quartz powder, talc, sericite, and bentonite; fibrous fillers such as asbestos, glass fibers and organic fibers; oil resistance modifiers such as potassium methacrylate; coloring agents; heat resistance modifiers such as red iron oxide and cerium oxide; low-temperature modifiers; thixotropic agents such as polyethers; dewatering agents; and bond modifiers such as γ-aminopropyltriethoxysilane.

There have been described RTV compositions comprising (A) a diorganopolysiloxane blocked with a hydroxyl group at each end of its molecular chain, (B) an α,β-substituted vinyloxysilane or a hydrolyzate thereof as a cross-linking agent, and (C) a perfluorocarboxylic acid derivative as a curing catalyst, which can be cured into rubbery elastomers with moisture in air. The compositions remain stable during shelf storage, do not corrode the surrounding metal upon curing, and their cured products are resistant against discoloration. They are not only useful as sealants in building and construction industries and FIPG materials in automobile industry, but also suitable as adhesives and sealants for electric and electronic parts because of their non-metal-corrosive nature.

EXAMPLE

Examples of the present invention are given below by way of illustration and not by way of limitation. Unless otherwise stated, parts and percents are by weight. Viscosity is a measurement at 25° C.

EXAMPLE 1

Composition I was prepared by blending 100 parts of a dimethylpolysiloxane blocked with a hydroxyl group at each end of its molecular chain having a viscosity of 20,200 centipoise, 12 parts of fumed silica surface treated with hexamethyldisilazane having a specific surface area of 150 m²/g, and 1.5 parts of titanium dioxide, and passing the blend through a three-roll mill once. The blend was further mixed with 6 parts of methyltriisopropenoxysilane and 0.5 parts of the perfluorocarboxylic derivative of the formula:

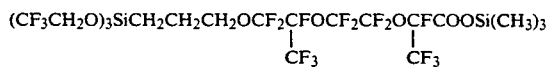

obtained in Reference Example 1 (described later) in an anhydrous condition while defoaming.

Composition I was formed into a sheet of 2 mm thick and allowed to stand for 7 days in an atmosphere at a temperature of 20°0 C. and a relative humidity of 55%. This caused the sheet to cure into a rubbery elastomer Ia.

Composition I remained stable over 6 months at room temperature if sealed against the ambient. This 6-month aged composition I was also formed into a sheet of 2 mm thick which was cured under the same conditions as above into a rubbery elastomer Ib. The elastomers obtained from the fresh and aged compositions were examined for physical properties (hardness, tensile strength and elongation) according to JIS C-2123.

Further, rubbery elastomer Ia was exposed to 200° C. for 7 days for thermal degradation. This thermally degraded rubbery elastomer Ic was similarly examined for physical properties.

The results are shown in Table 1.

TABLE 1

|  | Initial Elastomer Ia | Aged @ 20° C./6 month Elastomer Ib | Heated @ 200° C./7 days Elastomer Ic |
|---|---|---|---|
| Hardness, JIS-A | 29 | 31 | 33 |
| Tensile strength, kg/cm² | 20 | 19 | 21 |
| Elongation, % | 350 | 330 | 270 |

In addition, Composition I was tested by the metal corrosion test as prescribed in MIL-A-46146A.

Test method 1

Composition I, 15 grams, was placed in a 250-ml container. Onto Composition I was poured 5 to 10 ml of distilled water. A clean test piece was suspended above the water surface. The container was sealed at the top. The container was allowed to stand for 168 hours at 38° C. The test piece was visually observed for corrosion.

Test method 2

A test piece was cleaned with acetone and coated with Composition I, which was cured for 7 days at 25° C. and RH 50%. The test piece was then allowed to stand for 28 days at 49° C. and RH 98%. The rubbery elastomer coating was stripped using a knife. The surface of the test piece from which the coating was stripped was visually observed for corrosion.

The results are shown in Table 2.

TABLE 2

|  | Test piece | Result |
|---|---|---|
| Test method 1 | Brass | no corrosion |
|  | Steel | no corrosion |
|  | Aluminum | no corrosion |
| Test method 2 | Copper wire | no corrosion |
|  | Steel | no corrosion |
|  | Aluminum | no corrosion |

Rubbery elastomer Ia resulting from curing of Composition I was measured for a change of color at the initial, after heating at 90° C. for 168 hours, and after weatherometer exposure for 168 hours, using a differential colorimeter.

For comparison purposes, Composition II was prepared which had the same formulation as Composition I except that 0.5 parts of a guanidine derivative of the formula:

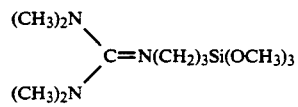

was used instead of the perfluorocarboxylic derivative. A cured sheet of 2 mm thick was formed from Composition II by the same procedure as described for Composition I and subjected to a discoloration test.

The results are shown in Table 3.

TABLE 3

|  | Composition I | | | | Composition II | | | |
|---|---|---|---|---|---|---|---|---|
|  | L | a | b | ΔE | L | a | b | ΔE |
| Initial | 94.2 | −0.3 | 1.9 | — | 92.6 | −0.9 | 2.5 | — |

TABLE 3-continued

|  | Composition I | | | | Composition II | | | |
| --- | --- | --- | --- | --- | --- | --- | --- | --- |
|  | L | a | b | ΔE | L | a | b | ΔE |
| 90° C./168 hr. | 93.6 | −1.8 | 7.7 | 6.0 | 88.2 | −3.6 | 18.2 | 16.5 |
| Weathering | 94.0 | −0.7 | 3.6 | 1.7 | 90.6 | −2.8 | 12.2 | 10.1 |

Discoloration $\Delta E = [(\Delta L)^2 + (\Delta a)^2 + (\Delta b)^2]^{\frac{1}{2}}$

EXAMPLE 2

Composition III was prepared by blending 100 parts of 3,3,3-trifluoropropylmethylpolysiloxane blocked with a hydroxyl group at each end of its molecular chain having a viscosity of 62,300 centipoise and 8 parts of fumed silica surface treated with dimethyldichlorosilane having a specific surface area of 180 m²/g and passing the blend through a three-roll mill once. The blend was further mixed with 6 parts of vinyltriisopropenoxysilane, 0.4 parts of the perfluorocarboxylic derivative of the formula:

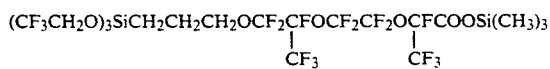

obtained in Reference Example 1 (described later), and 0.1 part of dibutyltindioctoate in an anhydrous condition while defoaming.

Composition III was formed into a sheet of 2 mm thick and allowed to stand for 7 days in an atmosphere at a temperature of 20° C. and a relative humidity of 55%. This caused the sheet to cure into a rubbery elastomer IIIa.

Composition III remained stable over 6 months at room temperature if sealed against the ambient. This 6-month aged composition III was also formed into a sheet of 2 mm thick which was cured under the same conditions as above into a rubbery elastomer IIIb. The elastomers obtained from the fresh and aged compositions were examined for physical properties (hardness, tensile strength and elongation) according to JIS C-2123.

Further, rubber elastomer IIIa was exposed to 200° C. for 7 days for thermal degradation. This thermally degraded rubbery elastomer IIIc was similarly examined for physical properties.

The results are shown in Table 4.

TABLE 4

| Elastomer | Initial IIIa | Aged @ 20° C./6 month IIIb | Heated @ 200° C./7 days IIIc |
| --- | --- | --- | --- |
| Hardness, JIS-A | 27 | 28 | 33 |
| Tensile strength, kg/cm² | 25 | 23 | 17 |
| Elongation, % | 280 | 260 | 200 |

In addition, Composition III was tested for metal corrosion as previously described. The results are shown in Table 5.

TABLE 5

|  | Test piece | Result |
| --- | --- | --- |
| Test method 1 | Brass | no corrosion |
|  | Steel | no corrosion |
|  | Aluminum | no corrosion |
| Test method 2 | Copper wire | no corrosion |
|  | Steel | no corrosion |
|  | Aluminum | no corrosion |

EXAMPLE 3

Composition IV was prepared by blending 100 parts of a dimethylpolysiloxane blocked with a hydroxyl group at each end of its molecular chain having a viscosity of 10,500 centipoise at 25° C. and 10 parts of carbon powder and passing the blend through a three-roll mill once. The blend was further mixed with 7 parts of phenyltriisopropenoxysilane and 0.4 parts of the perfluorocarboxylic derivative of the formula:

$(CH_3O)_3SiCH_2CH_2CH_2O(CF_2)_5COOSi(CH_3)_3$ obtained in Reference Example 3 (described later) in an anhydrous condition while defoaming.

Composition IV was formed into a sheet of 2 mm thick and allowed to stand for 7 days in an atmosphere at a temperature of 20° C. and a relative humidity of 55%. This caused the sheet to cure into a rubbery elastomer IVa.

Composition IV remained stable over 6 months at room temperature if sealed against the ambient. This 6-month aged composition IV was also formed into a sheet of 2 mm thick which was cured under the same conditions as above into a rubbery elastomer IVb. The elastomers obtained from the fresh and aged compositions were examined for physical properties (hardness, tensile strength and elongation) according to JIS C-2123.

The results are shown in Table 6.

TABLE 6

|  | Initial Elastomer IVa | Aged @ 20° C./6 month Elastomer IVb |
| --- | --- | --- |
| Hardness, JIS-A | 25 | 26 |
| Tensile strength, kg/cm² | 17 | 18 |
| Elongation, % | 250 | 230 |

REFERENCE EXAMPLE 1

A 2-liter, four-necked flask equipped with a reflux condenser and a stirrer was charged with 500 grams of cesium fluoride and 1000 grams of tetraglyme. With stirring, 1000 grams of an acid fluoride-terminated compound of the formula:

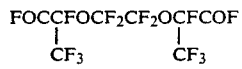

was added in increments through a dropping funnel. Then 371 grams of allyl bromide was added dropwise over 30 minutes through the dropping funnel. Using an oil bath, the flask was heated to keep the contents at 70° C. and stirring was continued for 24 hours at the temperature. At the end of reaction, the flask was cooled down to room temperature. After the precipitate was filtered off, the filtrate was distilled, yielding 503 grams of a fraction having a boiling point of 104°-106° C./140 mmHg. On analysis, this product was identified to be a compound of formula (9) shown below.

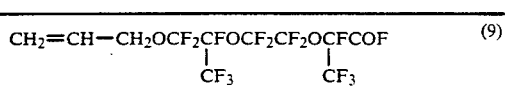

-continued

Analysis
$^1$H-NMR: δ (ppm)
- $CH_2=$    5.47
- $=CH-$    6.08
- $-CH_2-O-$    4.69

GC-MS:
- $(M + H)^+$    487

IR:
1880 cm$^{-1}$

Elemental analysis:

| | C | H | O | F |
|---|---|---|---|---|
| Calcd. (%) | 27.2 | 1.0 | 13.2 | 58.6 |
| Found (%) | 27.1 | 1.1 | 13.0 | 58.3 |

Next, a 500-ml, four-necked flask equipped with a reflux condenser and a stirrer was charged with 45 grams of water and 26 grams of sodium fluoride. Using an ice water bath, the flask was cooled until the contents reached 10° C. With stirring, 300 grams of the compound of formula (9) prepared above was added dropwise through a dropping funnel. The rate of addition was controlled such that the contents did not exceed 20° C. After the completion of addition, the ice water bath was removed and stirring was continued for 3 hours at room temperature. The solids were removed from the flask contents by filtration, and the filtrate was then distilled, yielding 268 grams of a fraction having a boiling point of 108°–110° C./3 mmHg. On analysis, this product was identified to be a compound of formula (10) shown below. The yield was 90%.

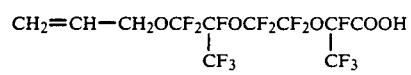
(10)

Analysis
$^1$H-NMR: δ (ppm)
- $CH_2=$    5.43
- $=CH-$    6.04
- $-CH_2-O-$    4.66
- $-COOH$    11.5

GC-MS:
- $(M + H)^+$    485

IR:
1780 cm$^{-1}$

Elemental analysis:

| | C | H | O | F |
|---|---|---|---|---|
| Calcd. (%) | 27.3 | 1.2 | 16.5 | 54.9 |
| Found (%) | 27.1 | 1.3 | 16.8 | 54.5 |

Next, a 500-ml, four-necked flask equipped with a reflux condenser and a stirrer was charged with 47 grams of bistrimethylsilylacetamide and 134 grams of toluene. With stirring, 200 grams of the compound of formula (10) prepared above was added dropwise through a dropping funnel. The rate of addition was controlled such that the contents did not exceed 50° C. After the completion of addition, stirring was continued for 2 hours at room temperature. The flask contents were then distilled, yielding 197 grams of a fraction having a boiling point of 97°–99° C./6 mmHg. On analysis, this product was identified to be a compound of formula (11) shown below. The yield was 85%.

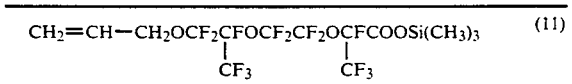
(11)

Analysis
$^1$H-NMR: δ (ppm)
- $CH_2=$    5.45
- $=CH-$    6.07
- $-CH_2-O-$    4.71
- $-Si(CH_3)_3$    0.51

GC-MS:
- $(M + H)^+$    557

IR:
1770 cm$^{-1}$

Elemental analysis:

| | C | H | O | F | Si |
|---|---|---|---|---|---|
| Calcd. (%) | 30.2 | 2.5 | 14.4 | 47.8 | 5.0 |
| Found (%) | 30.0 | 2.7 | 14.6 | 47.8 | 4.7 |

Next, a 200-ml, three-necked flask equipped with a reflux condenser, magnetic stirrer, and thermometer was charged with 80 grams of the compound of formula (11) prepare above. Using an oil bath, the flask was heated to keep the contents at 70° C. After 0.01 gram of a 10% toluene solution of chloroplatinic acid was added, 56.3 grams of tris(2,2,2-trifluoroethoxy)silane was slowly added through a dropping funnel. The rate of addition was controlled such that the contents were at 70° to 100° C. After the completion of addition, stirring was continued for one hour at 70° C. At the end of reaction, stirring was continued for further one hour at 70° C. Then the flask contents were poured into a distillation flask. The flask was heated by an oil bath adjusted at 80° C. while the flask interior was evacuated up to 2 mmHg by means of a vacuum pump. The volatile contents were distilled off in this way, leaving 118.2 grams of a non-volatile liquid in the flask. On analysis, this product was identified to be a compound of formula (12) shown below. The yield was 93%.

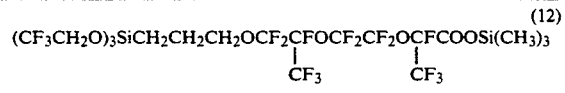
(12)

Analysis
$^1$H-NMR:

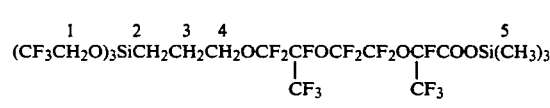

| | δ (ppm) |
|---|---|
| 1 | 4.17 |
| 2 | 4.17 |
| 3 | 1.91 |
| 4 | 1.01 |
| 5 | 0.51 |

GC-MS:
- $(M + H)^+$    883

IR:
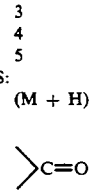
1770 cm$^{-1}$

Elemental analysis:

| | C | H | O | F | Si |
|---|---|---|---|---|---|
| Calcd. (%) | 27.2 | 2.4 | 14.5 | 49.5 | 6.4 |

| | | | | |
|---|---|---|---|---|
| Found (%) | 27.1 | 2.3 | 14.7 | 49.3 | 6.5 |

REFERENCE EXAMPLE 2

A 2-liter, four-necked flask equipped with a reflux condenser and a stirrer was charged with 434 grams of cesium fluoride and 880 grams of tetraglyme. With stirring, 600 grams of perfluoroadipic fluoride was added in increments through a dropping funnel. Then 321 grams of allyl bromide was added dropwise over 30 minutes through the dropping funnel. Using an oil bath, the flask was heated to keep the contents at 70° C. and stirring was continued for 24 hours at the temperature. At the end of reaction, the flask was cooled down to room temperature. After the precipitate was filtered off, the filtrate was distilled, yielding 350 grams of a fraction having a boiling point at 88°–90° C./140 mmHg. On analysis, this product was identified to be a compound of formula (13) shown below. The yield was 48%.

$$CH_2=CH-CH_2O(CF_2)_5COF \quad (13)$$

Analysis
$^1$H-NMR: δ (ppm)
- $CH_2=$    5.49
- $=CH-$    6.10
- $-CH_2O-$    4.70

GC-MS:
- $(M + H)^+$    355

IR:
$>C=O$    1880 cm$^{-1}$

Elemental analysis:

| | C | H | O | F |
|---|---|---|---|---|
| Calcd. (%) | 30.5 | 1.4 | 9.0 | 59.0 |
| Found (%) | 30.6 | 1.3 | 9.2 | 58.6 |

Next, a 500-ml, four-necked flask equipped with a reflux condenser and a stirrer was charged with 62 grams of water and 36 grams of sodium fluoride. Using an ice water bath, the flask was cooled until the contents reached 10° C. With stirring, 300 grams of the compound of formula (3) prepared above was added dropwise through a dropping funnel. The rate of addition was controlled such that the contents did not exceed 20° C. After the completion of addition, the ice water bath was removed and stirring was continued for 3 hours. The solids were removed from the flask contents by filtration, and the filtrate was then distilled, yielding 265 grams of a fraction having a boiling point of 93°–99° C./2 mmHg. On analysis, this product was identified to be a compound of formula (14) shown below. The yield was 88%.

$$CH_2=CH-CH_2O(CF_2)_5COOH \quad (14)$$

Analysis
$^1$H-NMR: δ (ppm)
- $CH_2=$    5.45
- $=CH-$    6.08
- $-CH_2-O-$    4.63
- $-COOH$    11.4

GC-MS:
- $(M + H)^+$    353

IR:
$>C=O$    1780 cm$^{-1}$ $$CH_2=CH-CH_2O(CF_2)_5COOH \quad (14)$$

Elemental analysis:

| | C | H | O | F |
|---|---|---|---|---|
| Calcd. (%) | 30.7 | 1.7 | 13.6 | 54.0 |
| Found (%) | 30.8 | 1.6 | 13.3 | 54.1 |

Next, a 500-ml, four-necked flask equipped with a reflux condenser and a stirrer was charged with 48 grams of bistrimethylsilylacetamide and 100 grams of toluene. With stirring, 150 grams of the compound of formula (14) prepared above was added dropwise through a dropping funnel. The rate of addition was controlled such that the contents did not exceed 50° C. After the completion of addition, stirring was continued for 2 hours at room temperature. The flask contents were then distilled, yielding 156 grams of a fraction having a boiling point of 93.0°–93.5° C./6 mmHg. On analysis, this product was identified to be a compound of formula (15) shown below. The yield was 86%.

$$CH_2=CHCH_2O(CF_2)_5COOSi(CH_3)_3 \quad (15)$$

Analysis
$^1$H-NMR: δ (ppm)
- $CH_2=$    5.39
- $=CH-$    6.03
- $-CH_2-O-$    4.66
- $-Si(CH_3)_3$    0.50

GC-MS:
- $(M + H)^+$    425

IR:
$>C=O$    1770 cm$^{-1}$

Elemental analysis:

| | C | H | O | F | Si |
|---|---|---|---|---|---|
| Calcd. (%) | 34.0 | 3.3 | 11.3 | 44.8 | 6.6 |
| Found (%) | 34.2 | 3.2 | 11.3 | 44.7 | 6.5 |

Next, a 200-ml, three-necked flask equipped with a reflux condenser, magnetic stirrer, and thermometer was charged with 70 grams of the compound of formula (15) prepared above. Using an oil bath, the flask was heated to keep the contents at 70° C. After 0.01 gram of a 10% toluene solution of chloroplatinic acid was added, 64.5 grams of tris(2,2,2-trifluoroethoxy) silane was slowly added through a dropping funnel. The rate of addition was controlled such that the contents were at 70° to 100° C. After the completion of addition, stirring was continued for one hour at 70° C. At the end of reaction, the flask contents were poured into a distillation flask. The flask was heated by an oil bath adjusted at 80° C. while the flask interior was evacuated up to 2 mmHg by means of a vacuum pump. The volatile contents were distilled off in this way, leaving 120.3 grams of a non-volatile liquid in the flask. On analysis, this product was identified to be a compound of formula (16) shown below. The yield was 97%.

$$(CF_3CH_2O)_3SiCH_2CH_2CH_2O(CF_2)_5COOSi(CH_3)_3 \quad (16)$$

Analysis
$^1$H-NMR:

$$\overset{1}{(CF_3CH_2O)_3}Si\overset{2}{CH_2}\overset{3}{CH_2}\overset{4}{CH_2}O(CF_2)_5COO\overset{5}{Si(CH_3)_3}$$

| | δ (ppm) |
|---|---|
| 1 | 4.17 |
| 2 | 4.17 |

-continued

| (CF₃CH₂O)₃SiCH₂CH₂CH₂O(CF₂)₅COOSi(CH₃)₃ | (16) |
|---|---|
| 3 | 1.91 |
| 4 | 1.01 |
| 5 | 0.51 |
| GC-MS: (M + H)⁺ | 751 |
| IR: | 1770 cm⁻¹ |

Elemental analysis:

| | C | H | O | F | Si |
|---|---|---|---|---|---|
| Calcd. (%) | 28.8 | 2.8 | 12.8 | 48.1 | 7.5 |
| Found (%) | 29.0 | 2.6 | 12.9 | 48.3 | 7.2 |

REFERENCE EXAMPLE 3

A 200-ml, three-necked flask equipped with a reflux condenser, magnetic stirrer, and thermometer was charged with 70.0 grams of the compound of formula (15) obtained in Reference Example 2. Using an oil bath, the flask was heated to keep the contents at 70° C. After 0.01 gram of a toluene solution of chloroplatinic acid was added, 24.2 grams of trimethoxysilane was slowly added through a funnel. The rate of addition was controlled such that the contents were at 70° to 100° C. After the completion of addition, stirring was continued for one hour at 70° C. At the end of reaction, the flask contents were poured into a distillation flask. The flask was heated by an oil bath adjusted at 80° C. while the flask interior was evacuated up to 2 mmHg by means of a vacuum pump. The volatile contents were distilled off in this way, leaving 85.2 grams of a non-volatile liquid in the flask. On analysis, this product was identified to be a compound of formula (17) shown below. The yield was 95%.

| (CH₃O)₃SiCH₂CH₂CH₂O(CF₂)₅COOSi(CH₃)₃ | (17) |
|---|---|

Analysis
¹H-NMR:

$$\underset{1}{(CH_3O)_3Si}\underset{2}{CH_2}\underset{3}{CH_2}\underset{4}{CH_2}O(CF_2)_5\underset{5}{COOSi(CH_3)_3}$$

| | | δ (ppm) |
|---|---|---|
| | 1 | 3.51 |
| | 2 | 1.01 |
| | 3 | 1.91 |
| | 4 | 4.17 |
| | 5 | 0.51 |
| GC-MS: | (M + H)⁺ | 546 |
| IR: | | 1770 cm⁻¹ |

Although some preferred embodiments have been described, many modifications and variations may be made thereto in the light of the above teachings. It is therefore to be understood that within the scope of the appended claims, the invention may be practiced otherwise than as specifically described.

We claim:

1. A room temperature vulcanizable organopolysiloxane composition comprising
   (A) a diorganopolysiloxane blocked with a hydroxyl group at each end of its molecular chain,
   (B) an α,β-substituted vinyloxysilane of general formula (I) or (II):

wherein
R¹ is a substituted or unsubstituted monovalent hydrocarbon group,
R² and R³ are independently selected from the class consisting of a hydrogen atom and a substituted or unsubstituted monovalent hydrocarbon group,
R⁴ is a substituted or unsubstituted divalent hydrocarbon group, and
letter n is equal to 3 or 4, or a hydrolyzate thereof, and
(C) a perfluorocarboxylic acid derivative of the general formula (III):

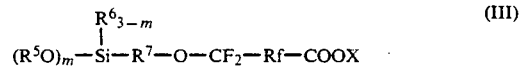

wherein
R⁵ and R⁶ are independently selected from substituted or unsubstituted monovalent hydrocarbon groups,
R⁷ is a substituted or unsubstituted divalent hydrocarbon group,
Rf is a divalent perfluoroalkyl or perfluoroalkylether group,
X is a hydrogen atom or triorganosilyl group, and
letter m is equal to 2 or 3.

2. The composition of claim 1 comprising 100 parts by weight of (A), 1 to 25 parts by weight of (B), and 0.01 to 5 parts by weight of (C).

* * * * *